US010095256B2

(12) United States Patent
Ogawa

(10) Patent No.: US 10,095,256 B2
(45) Date of Patent: Oct. 9, 2018

(54) POWER CONTROL DEVICE, METHOD, AND PROGRAM BASED ON EVALUATION FUNCTIONS REGARDING UPPER LIMIT AMOUNT OF POWER

(71) Applicant: NEC Corporation, Minato-ku, Tokyo (JP)

(72) Inventor: Masatsugu Ogawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 374 days.

(21) Appl. No.: 14/891,826

(22) PCT Filed: May 28, 2014

(86) PCT No.: PCT/JP2014/064797
§ 371 (c)(1),
(2) Date: Nov. 17, 2015

(87) PCT Pub. No.: WO2014/208299
PCT Pub. Date: Dec. 31, 2014

(65) Prior Publication Data
US 2016/0091914 A1   Mar. 31, 2016

(30) Foreign Application Priority Data
Jun. 24, 2013   (JP) .................................. 2013-131342

(51) Int. Cl.
*G05F 1/66* (2006.01)
*G05B 15/02* (2006.01)
(Continued)

(52) U.S. Cl.
CPC .............. *G05F 1/66* (2013.01); *G05B 15/02* (2013.01); *H02J 3/14* (2013.01); *H02J 13/001* (2013.01);
(Continued)

(58) Field of Classification Search
CPC ... G05F 1/66; G05B 15/02; G05B 2219/2639; G05B 2219/2642; H02J 3/14;
(Continued)

(56) References Cited

U.S. PATENT DOCUMENTS 4,551,812 A  * 11/1985 Gurr .......................... H02J 3/14
                                                                    307/35
4,819,180 A  *  4/1989 Hedman ............ G01R 21/1333
                                                                    307/35
(Continued)

FOREIGN PATENT DOCUMENTS

JP    H11-178247 A    7/1999
JP    2000-50500 A    2/2000
(Continued)

OTHER PUBLICATIONS

International Search Report for PCT Application No. PCT/JP2014/064797, dated Aug. 5, 2014.
(Continued)

*Primary Examiner* — M. N. Von Buhr

(57) ABSTRACT

On receiving a request to reduce power consumption such as a request for power conservation, a power control device controls power used in a power consumption system including a plurality of devices so that a user can use enough consumable power while saving power in the most comfortable manner possible. The plurality of devices is classified into controllable devices and control-difficult devices. An information acquisition unit acquires amounts of power used by the controllable devices and an amount of most recently measured power of the entire power consumption system. When an amount of an upper limit power is set for the entire power consumption system, a demand control unit controls the amounts of power used by the controllable devices based on evaluation functions set for the respective controllable
(Continued)

devices and differential equations set for the respective controllable devices.

9 Claims, 8 Drawing Sheets

(51) Int. Cl.
*H02J 3/14* (2006.01)
*H02J 13/00* (2006.01)

(52) U.S. Cl.
CPC ............. *G05B 2219/2639* (2013.01); *G05B 2219/2642* (2013.01); *Y02B 70/3225* (2013.01); *Y02B 70/3241* (2013.01); *Y02E 40/76* (2013.01); *Y04S 10/545* (2013.01); *Y04S 20/222* (2013.01); *Y04S 20/227* (2013.01)

(58) Field of Classification Search
CPC .... H02J 13/001; Y04S 10/545; Y04S 20/222; Y04S 20/227; Y02B 70/3225; Y02B 70/3241; Y02E 40/76
See application file for complete search history.

(56) References Cited

U.S. PATENT DOCUMENTS

| | | | | |
|---|---|---|---|---|
| 8,417,391 | B1* | 4/2013 | Rombouts | G05B 13/02 700/286 |
| 9,626,635 | B2* | 4/2017 | Ogawa | G06Q 10/04 |
| 2011/0270460 | A1* | 11/2011 | Furuichi | H02J 3/14 700/295 |
| 2012/0158202 | A1* | 6/2012 | Yano | H02J 3/14 700/293 |
| 2012/0185106 | A1* | 7/2012 | Ghosh | G06Q 10/04 700/291 |
| 2013/0046411 | A1* | 2/2013 | Al Faruque | H02J 3/32 700/286 |
| 2013/0178991 | A1* | 7/2013 | Gheerardyn | G05B 13/02 700/286 |
| 2013/0178993 | A1* | 7/2013 | Rombouts | G05B 13/02 700/291 |
| 2014/0001977 | A1* | 1/2014 | Zacharchuk | H04L 12/2816 315/291 |
| 2014/0094935 | A1* | 4/2014 | Ogawa | G06Q 10/04 700/12 |
| 2014/0249687 | A1* | 9/2014 | Ogawa | G06Q 10/06 700/297 |
| 2014/0371942 | A1* | 12/2014 | Matsuyama | H02J 3/14 700/297 |
| 2015/0057824 | A1* | 2/2015 | Gheerardyn | G05B 13/02 700/296 |
| 2015/0303693 | A1* | 10/2015 | Wu | H02J 3/14 307/31 |
| 2015/0331021 | A1* | 11/2015 | Umamoto | G01R 11/00 324/103 R |
| 2016/0170428 | A1* | 6/2016 | Ichien | G06Q 50/16 700/297 |
| 2017/0179762 | A1* | 6/2017 | Zaharchuk | H02J 13/0075 |

FOREIGN PATENT DOCUMENTS

| | | |
|---|---|---|
| JP | 2002-165365 A | 6/2002 |
| JP | 2004-145396 A | 5/2004 |
| JP | 2005-341646 A | 12/2005 |
| JP | 2006-74952 A | 3/2006 |
| JP | 2010-124605 A | 6/2010 |
| JP | 2010-146387 A | 7/2010 |
| WO | 2012/160978 A1 | 11/2012 |

OTHER PUBLICATIONS

English translation of Written opinion for PCT Application No. PCT/JP2014/064797.

* cited by examiner

POWER CONTROL DEVICE, METHOD, AND PROGRAM BASED ON EVALUATION FUNCTIONS REGARDING UPPER LIMIT AMOUNT OF POWER

This application is a National Stage Entry of PCT/JP2014/064797 filed on May 28, 2014, which claims priority from Japanese Patent Application 2013-131342 filed on Jun. 24, 2013, the contents of all of which are incorporated herein by reference, in their entirety.

TECHNICAL FIELD

This invention relates to a device, method, and a program for controlling power of respective devices constituting a power consumption system most suitably in an environment where an upper limit power is set in the power consumption system comprising a plurality of devices.

BACKGROUND ART

Various studies have been previously made for a system for controlling power. As such power control systems, there are, for example, an HEMS (Home Energy Management System) for controlling power in a home, a BEMS (Building Energy Management System) for controlling power in a building, and a CEMS (Community/City Energy Management System) for controlling power in an area such as a municipality. The objective of those power control system is for forming a sustainable society by bringing efficiency to use of power or by actively using nature originated energy (solar light, wind power, geothermal heat, or the like). Hitherto, power control means power control at supply side such as power plants.

However, with rise of energy management systems, in recent years, there is an active move afoot to carry out power control at demand side. This is called a "demand side management". There are several types of the demand side management. By way of illustration, as the demand side management, there are one for controlling power demand geared toward for a small free as much as possible in response to a dynamic placing so as to change the cost of power hourly and another for controlling power demand in order to ward off failure such as a power failure by cutting a peak upon power demand peak. As a concrete example of the latter, a power-saving request is made for the building when demand for power tightens. That is, power which each building may use at an upper limit (which will later be called an "upper limit power") is notified. It is touted for each building to restrain within the notified upper limit power.

It is conceivable that a request to wish to control demand for the upper limit power become large in future. This is because policy and popular mandate move from conventional trend in which power may be used as you can use in the direction of skillfully using limited power. To enlarge power plants in agreement with demand is impossible in policy and it is said that the occurrence of demand which may outstrip the total amount of generation of electric power in the power plants is on the order of several days throughout the year. Under the circumstances, it is reasonable to control the demand side than making the supply side power-up. In addition, the demand control is also important in crisis management because it may not make a simultaneously planned power cut if the demand is flexibly controlled on occurrence of disaster.

Under these circumstances, studies for making the demand control for the upper limit power have been carried out. A method carried out in a current BEMS is a method: of preliminarily laying down a plan whether or not respective devices (air conditioners, light fixtures, elevators, and so on) in the building are stopped on a power-saving request; and of stopping, in response to the power-saving request, the preliminarily planed devices in agreement with the upper limit power. Although it is understood that the demand control can be easily carried out if doing in this manner, but whether or not it is comfort for people in the building is another story.

There are devices whose power cannot be controlled in the building. For example, in the building in which business facility is combined in one unit, it is to be wished that it does not conserve electricity devices in the business facility. This is because customers leave if a power savings so that the customers think unpleasant is carried out. In such a case, the devices in the business facility are dealt with as outside of power controlled objects. In this event, inasmuch as power used in the business facility always changes, the demand control is carried out so as to estimate the maximum amount of power used in the business facility in expectation of safety and to stop the devices. It falls into the situation where the power-saving is continued to excess in a floor on which the devices are controlled even if the business facility does not use the maximum amount of power. In a word, although the power-saving request is satisfied, it results in the power-saving in which people in the building endure because the power-saving is made more than necessary. In addition to this, there is a case where devices which are not planned to stop are turned off, it therefore results in the extra power-saving including portion of such devices.

Not only the above-mentioned example, the current demand control preliminarily makes a study of a forecast for demand and supply and of a plan when the devices are used or are stopped, and carries out control in keeping with the plan. In a case of such a control, it results in the power-saving with a margin more than necessary because the preliminarily made plan may come off and the devices in which power cannot be controlled in the manner as the above-mentioned example are expected. In order to make people which live and work at this place spend comfortably to the maximum, a technique to control power of the devices as circumstances demand is necessary by comparing the upper limit power and the total of current used power without the preliminarily determined plan.

Various prior art documents related to this invention are known.

For example, JP-A-HEI11-178247 (Patent Literature 1) discloses a "power consumption management system" which comprises: holding a value of a maximum permissible power consumption based on a value of a contract power for an electric utility; comparing a total value of power consumption of all devices with the value of the maximum permissible power consumption; notifying a centralized control office of information of an ambient temperature and so on; and controlling the power consumption of the respective devices.

In addition, JP-A-2004-145396 (Patent Literature 2) discloses an "electric power transaction management method" which comprises: deriving, using Ito's lemma, a stochastic process following price in a case where demand makes the geometric Brownian movement on the assumption that there is a determined functional relationship between power demand and power price; and deriving, using no decision principle, a differential equation for dominating price of derivative securities written on such a stochastic process.

JP-A-2005-341646 (Patent Literature 3) discloses an "energy saving system" which comprises: managing control priority information for determining which energy device should be preferentially controlled; and controlling energy suppression of the devices in order of decreasing priority.

In addition, JP-A-2006-74952 (Patent Literature 4) discloses an "electric power peak-off control system" which comprises: comparing a reported reduced amount of electric power with a reduced amount of electric power after being controlled and measured; and comparatively determining the value so as to reach the reduced amount of electric power thereby carrying out reduction of electric power peak.

Furthermore, JP-A-2010-124605 (Patent Literature 5) discloses a "power consumption prediction device" which comprises: comparing among power consumption data to apply an evaluation function; and extracting power consumption data having a high correlation value from actual data.

JP-A-2010-146387 (Patent Literature 6) discloses an "energy saving behavior evaluating apparatus" in which an energy saving behavior evaluation part acquires data in yesterday or last week from an appliance information database to evaluate them using an evaluation function, and records an evaluated value in an evaluated result database.

WO2012/160978 (Patent Literature 7) discloses an invention relating to a method comprising of autonomously and dispersively controlling a plurality of devices and of carrying out optimal load dispersion on the whole.

PRIOR ART DOCUMENTS

Patent Literature

Patent Literature 1: JP-A-HEM-178247 ([0017]-[0019])
Patent Literature 2: JP-A-2004-145396 ([0091])
Patent Literature 3: JP-A-2005-341646 ([0037]-[0038])
Patent Literature 4: JP-A-2006-74952 ([0022]-[0023])
Patent Literature 5: JP-A-2010-124605 ([0079])
Patent Literature 6: JP-A-2010-146387 ([0024])
Patent Literature 7: WO2012/160978

SUMMARY OF THE INVENTION

Problem to be Solved by the Invention

In the manner which is described above, the demand control for controlling power of the devices as circumstances demand is desirable. However, it is difficult to actualize the demand control in reality and an effective methodology is not proposed. Main reasons for making actualization of the demand control difficult are as follows. First reason is that there are a lot of devices to be controlled (controllable devices). Second reason is that it is impossible to follow real-time fluctuations in power used in devices of no controlled object (control-difficult devices). There is a level of a thousand of air conditioners, light fixtures and so on in a large building, and controlled objects increase in number if it responds to a power-saving request in concert with buildings. In the years ahead, in a level of the CEMS, it controls the devices ten times of the BEMS. It is very difficult to control them in real time so as to satisfy the upper limit power in consideration of the fluctuations of the power used in the devices of no controlled object (the control-difficult devices). This is because it must solve a problem of a combination of an infinite circumstance and device control.

Patent Literature 1 merely discloses the power consumption management system for controlling the power consumptions in the respective devices but does not consider the fluctuations of the power used in the control-difficult devices.

Patent Literature 2 merely discloses the electric power transaction risk management method for carrying out measure of a risk in future price of power but does not carry out the control of the power used in the devices.

Patent Literature 3 merely discloses the energy saving system for carrying out the energy control at priority in accordance with a request of a customer or a living environment but does not consider the fluctuations of the power used in the control-difficult devices in the manner similar to Patent Literature 1.

Patent Literature 4 merely discloses the electric power peak-off control system which is capable of easily controlling an electric power peak in the entire community with stability but does not consider the fluctuations of the power used in the control-difficult devices in the manner similar to Patent Literatures 1 and 3.

Patent Literature 5 merely discloses the power consumption prediction device but does not control power used in the devices.

Patent Literature 6 merely discloses the energy saving behavior evaluating apparatus for measuring conditions used in the devices as well as measuring power consumption of the devices but does not control power used in the devices.

Patent Literature 7 merely discloses the method of carrying out optimal load dispersion on the whole but neither describes nor suggests a concrete method of dynamic load dispersion among a plurality of devices constituting a power consumption system.

Object of the Invention

It is therefore an object of the present invention to provide a power control device, method, and program which are capable of controlling power used in a large-scale power consumption system in real time so as to satisfy an upper limit power in consideration of fluctuations of power used in devices of no controlled object (control-difficult devices).

Means to Solve the Problem

A power control device according to this invention is a power control device for controlling a power used in a power consumption system comprising a plurality of devices, the plurality of devices being classified into controllable devices and control-difficult devices, wherein the power control device comprises: an information acquisition unit configured to acquire amounts of power used by the controllable devices and an amount of the most recently measured power of the entire power consumption system; and a demand control unit configured to control the amounts of power used by the controllable devices based on evaluation functions set for the respective controllable devices and differential equations set for the respective controllable devices when an upper limit amount of power is set for the entire power consumption system.

Effect of the Invention

According to this invention, it is possible to control power used in a large-scale power consumption system in real time so as to satisfy an upper limit power in consideration of fluctuations of power used in devices of no controlled object.

MODES FOR EMBODYING THE INVENTION

Now, an exemplary embodiment of this invention will be described with reference to drawings in detail.

EXEMPLARY EMBODIMENT

Now, the description will proceed to an exemplary embodiment of this invention by taking, as an example, a case of power control of a building.

Figure 1:
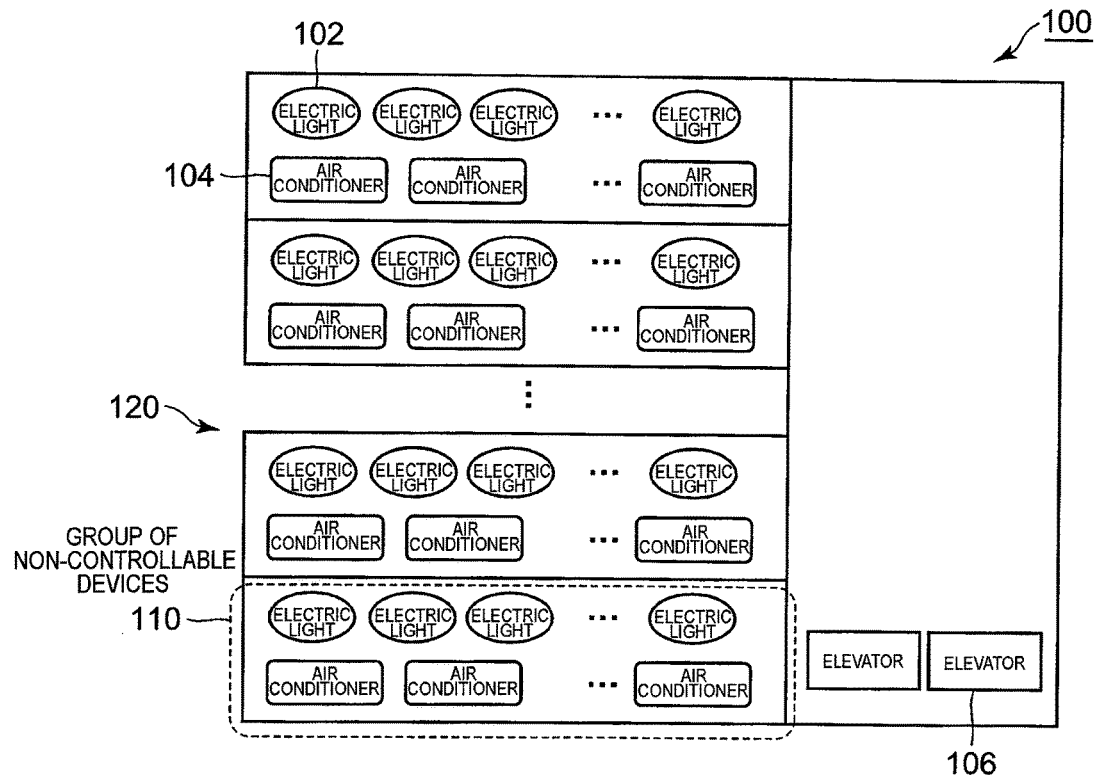
FIG. 1 is a schematic diagram of a power consumption system using a power control device according to an exemplary embodiment of this invention.

FIG. 1 is a schematic diagram of a power consumption system 100 comprising a plurality of devices arranged in the building. The illustrated power consumption system 100 includes, as the devices, a lot of electric lights 102, a lot of air conditioners 104, and a plurality of elevators 106.

In FIG. 1, a "group of non-controlled devices" enclosed in a dotted line are devices without controlled object (devices of non-controlled object) 110. Other than them are the controlled objects 120. Herein, the devices without controlled object (the devices of non-controlled object) 110 will be also called "control-difficult devices" while the controlled objects 120 will be also called "controllable devices". That is, a lot of devices are classified into the controllable devices 120 and the control-difficult devices 110.

The exemplary embodiment of this invention considers, when there are such as a lot of devices 102, 104, and 106 in the power consumption system 100, a methodology for controlling the controlled objects 120 at real time so as to satisfy an upper limit power in consideration of fluctuations of power used in the devises 110 without the controlled objects.

Now, it is necessary to assign priorities to the devices. The priorities are assigned so that the more important to the goods or man activating in the building, the higher priorities are assigned. That is to say, it means that it is possible to form circumstances so that it is difficult to stop the devices having the high priorities although the devices are stopped under a condition of a power-saving request and it is possible to control without interfering with the most of activity of goods or the man.

In the devices with the same priority whether or not the devices are stopped under a condition of limit of power, they are different in accordance with a property of a floor. By way of illustration, the air conditioner 104 located in a server room has a high priority while the electric light 102 has a low priority. On the other hand, the priority of the electric light 102 in an office floor is higher than that of the electric light 102 in the sever room. If it considers the more detailed control, it is considered that the priority of the air conditioner 104 in a floor in which a lot of people stay is up while the priority of the air conditioner 104 in a floor in which a few people stay is down. In the manner as described above, the priorities of the devices in the building are variety.

Among methodologies for controlling the devices with priorities assigned, the most easily considered methodology is a methodology for assigning and arranging with the priorities to the devices by the amount of the devices. Such a thing may be possible in a case where the amount of the devices is limited or the priorities are obvious. However, in a real case, the amount of the devices is enormous and there are a lot of devices having a level of the same priority. Furthermore, in a case of the building or the like, there is a possibility that the priorities of the devices are changed quickly due to a change of layout or the like.

In light of such a situation, to assign and arrange with the priorities to the devices by the amount of the devices is not a realistic methodology. Accordingly, it is desirable to set priorities to the respective devices independently although the devices are assigned with the priorities. This also means that a sense where it is possible to set independently is a sense where the priorities with the same level may be assigned with different devices.

In such a case where the devices are set with the priorities independently, setting of the priorities is simple and is easy to correlate with comfortableness of activity of real people but is complicate to control. In a case where there are different devices having the same priority, it is not easy to determine how much power is assigned to which device. Moreover, it is all the more in a case where it satisfies the upper limit power in consideration of the fluctuations of power of the devices 110 without the controlled objects.

In order to actualize such a different real-time control, the present inventor applied an "autonomous decentralized methodology for load balancing" disclosed in the abovementioned Patent Literature 7. Now, the description will proceed to the autonomous decentralized methodology for load balancing in brief.

The present inventor invented the methodology for controlling a plurality of elements in an autonomous decentralized fashion to carry out load balancing optimally as a whole. In this case, the elements may be anything such as servers, generators, or the like, in the present invention, the devices in which the power control should be carried out are equivalent to the elements. In this invention, in the autonomous decentralized methodology for load balancing, evaluation functions to the respective elements first are set consistent with the performance of the elements.

Figure 2:
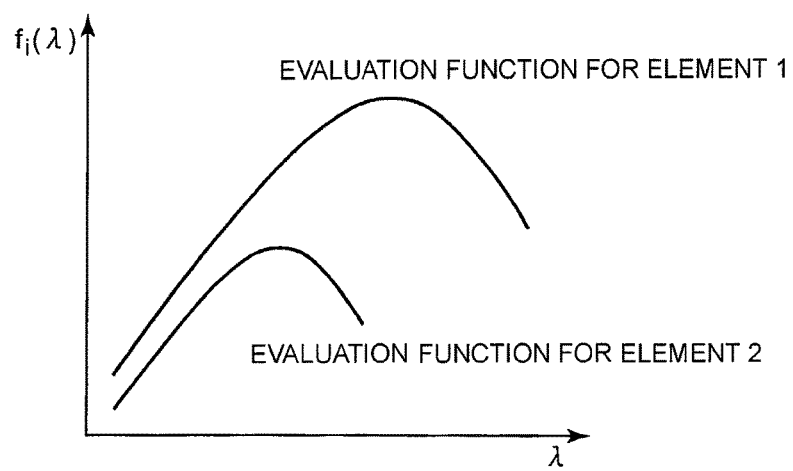
FIG. 2 is a schematic diagram of an evaluation function used in the power control device according to the exemplary embodiment of this invention.

FIG. 2 shows a brief overview of the evaluation functions. In FIG. 2, the abscissa represents a parameter relating to a state of each element that, in a case of an example of load balancing of a server, corresponds to an amount of loads of the server. In FIG. 2, the ordinate represents an indicator relating to any efficiency, profits, performance of the elements, priorities of the elements, or the like. The evaluation function is represented by a convex function.

To use the convex function is a point of this control methodology. This is because indicators in many systems that include the efficiency are represented by the convex function as illustrated in FIG. 2. Although a function of a convex upward as shown in FIG. 2 is called a concave function while a function of a convex downward is called a convex function, herein, expression for differentiating on a property of the function is adopted, the concave function is also represented as the convex function.

A problem for optimizing as a whole in conjunction with the elements having the evaluation functions of the convex functions (the sum total of values of the evaluation functions of the respective elements becomes the maximum) is known as a "convex programming problem". The convex programming problem is mathematically proved so that optimization is achieved under a condition where differential values of the evaluation functions in operation levels of the respective elements are equal to one another. The load balancing methodology in which the present inventor invented applies to this principle. This is a reason where the convex functions are used as the evaluation functions.

In consideration of this principle, a state change of each element is controlled in accordance with a differential equation which is represented by, for example, the following expression (1):

$$\frac{d\lambda_i}{dt} = K_1 \frac{Dem - \sum_k \lambda_k}{Dem} + K_2 \left( \frac{df_i}{d\lambda_i} - \frac{df_k}{d\lambda_k} \right) \quad (1)$$

where Dem represents an output value or a load value or a state value in which all of the elements should be satisfied, $\lambda_i$ represents an output value or a load value or a state value of an element i, $f_i$ represents an evaluation function set to the element i, and $K_1$ and $K_2$ represent coefficients corresponding to gains of state change. By applying this control, each element operates to change a state so as to become equal to the output value in which all of the elements should be satisfied by the first right side term and to change the state so as to make the differential value $(df_i/d\lambda_i)$ of the evaluation function equal to each other by the second right side term.

In the manner which is described at the "convex programming problem", this is equivalent to control the state (the load amount) of each element at a point where all of profits are maximized in a state where total amounts of states in which all of the elements should be satisfied are satisfied. In other words, by control of the above-mentioned expression (1), the efficiency set at the ordinate of the evaluation function is maximized in a system on the whole. A symbol k means a number of an element adjacent to the element i. If there is a plurality of adjacent elements k, the control of the expression (1) may be repeated one by one. A mathematical expression indicated by the expression (1) is one example, the point is that the state of each element is determined so as to make the differential values of the evaluation functions set in the respective elements an equal state.

Specifically, control becomes so that each element adds, every time steps dt for control, the product of a value calculated at the expression (1) and the time step dt to an output value antecedent to one time instant to produce the added one. It is a very simple control.

The problem of load balancing requires a judgment for stopping elements in which there no merit on operating. The above-mentioned judgment in the load balancing methodology invented by the present inventor is carried out as follows.

First, an indicator between an evaluation function of an element itself and an evaluation function of a node (element) adjacent to this element is defined.

Figure 3:
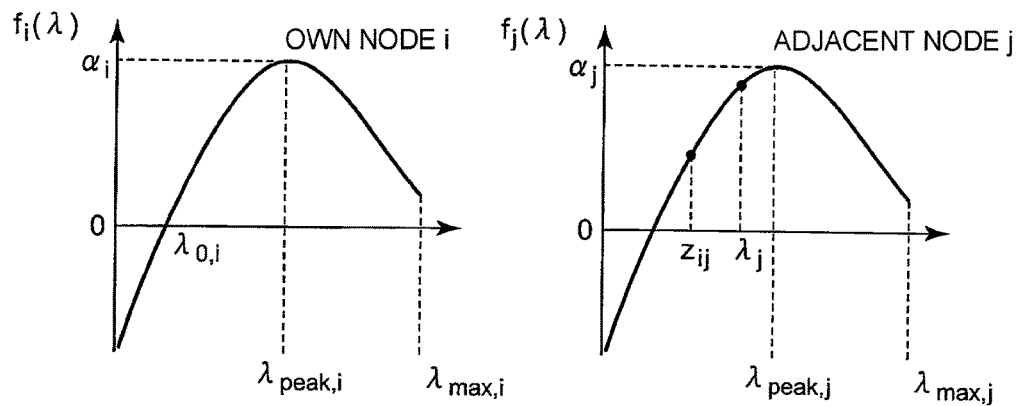
FIG. 3 is a view for use in describing an indicator using in the power control device according to the exemplary embodiment of this invention.

A figure for explaining this is showed in FIG. 3. Although this figure shows an example so that an evaluation function takes a negative value when a load is zero, this means that a cost occurs by starting. Although it is difficult to image somewhat in a case of an IT system such as a server, for example, in a case of a power plant, when it is considered that the ordinate is a profit, if there is no demand in spite of the fact that it operates (starts), an operating cost exceeds recovery (an amount collected from customers) and the profit becomes minus. A point where the evaluation function has a value of zero is a point where a balance between the operating cost and the recovery is achieved, and that where the value of the evaluation function becomes plus means that the profit occurs.

In a case of optimizing a response of the server, the ordinate becomes an amount relating to the response, the evaluation function has a value of positive even if the load is zero. That is to say, although there is a possibility that the evaluation function takes either positive or negative at the load of zero, when it is considered to part taking the value of negative, it is possible to resolve as a part of this when it takes the value of positive. Accordingly, herein, the description will be made as regards a general-purpose case where the evaluation function takes the value of negative at the load of zero.

It is herein assumed that $\lambda_{0,i}$ is a zero-cross point of a node i (own), $z_{ij}$ is a point having an inclination similar that of the zero-cross point of the node i in an evaluation function of an adjacent node j, and $\lambda_j$ is a current load of the adjacent node j. Accordingly, $z_{ij}$ can be written by the following expression (2):

$$\left( \frac{df_j}{d\lambda_j} \right)_{\lambda_j = z_{ij}} = \left( \frac{df_i}{d\lambda_i} \right)_{\lambda_i = \lambda_{0,i}} \quad (2)$$

And then, herein, an indicator $S_i$ represented by the following expression (3) is defined:

$$S_i = \sum_{j \neq i} (\lambda_j - z_{ij}) - \lambda_{0,i} \quad (3)$$

This indicator $S_i$ means what is a large of the load (a total sum) of the current adjacent node than that of the zero-cross point of the own node. If the node i stops, a condition which is should start the node i is whether or not the node i on being started is put into a circumstance which takes charge of a load more than the zero-cross point. And, since the profit does not become minus (the value of the evaluation function of zero), it does not count against although the node i is started.

The indicator $S_i$ is one obtained by converting this into numbers. The first right side term indicates that the adjacent node takes charge of the load than $z_{ij}$ equivalent to the differential value of the evaluation function in the zero-cross point of the node i, the indicator is obtained by subtracting the zero-cross point $\lambda_{0,i}$, (the second right side term) from this to indicate whether the load equal to or more than the zero-cross point of the own node exists around it.

If the indicator $S_i$ is larger than zero, the node i takes charge of the load of which the adjacent node takes charge when the node i is started, and the load of which the node i takes charge is equal to or more than the zero-cross point. Conversely, if the indicator $S_i$ is smaller than zero, the load of which the node i takes charge is equal to or less than zero even if the node i newly takes charge of the load of which the adjacent node takes charge, the profit becomes minus by starting the node i.

The indicator $S_i$ is such as one, it is understood whether the node i should be started or stopped by observing positive and negative in the indicator $S_i$. A case where the indicator $S_i$ is negative means that the load of the node i at this time instant is situated at an area where the evaluation function takas the value of negative, it may be considered that the started node stops at a time instant when the evaluation function is equal to or less than zero. It is possible to judge starting and stopping of the element by using the indicator $S_i$ in the manner which is described above.

Above is the brief description of the autonomous decentralized methodology for load balancing which the present inventor invented and which is disclosed in the above-mentioned Patent Literature 7. The present invention applies this methodology. On applying the above-mentioned methodology in a current case, handling of the first right side term and setting of the evaluation function hold a key. The present inventor has been considering about this point diligently and fell conception as follows.

In this case, the controllable devices 120 and the control-difficult devices 110 are intermingled in the power consumption system 100. When it makes to satisfy the upper limit power in such a circumstance, it will not succeed if the upper limit power is merely set to Dem of the first right side term of the above-mentioned expression (1). Thus, this case becomes deformed the first right side term to use a differential equation represented by the following expression (4):

$$\frac{d\lambda_i}{dt} = K_1 \frac{Dem - P_t}{Dem} + K_2 \left( \frac{df_i}{d\lambda_i} - \frac{df_k}{d\lambda_k} \right) \quad (4)$$

where $P_t$ represents the amount of used power of the entire building. In a case where the building is not controlled, $P_t$ represents the amount of used power (the amount of the most recently measured power) of the entire power consumption system 100 serving as a target. Pt includes all of the amounts of power where the controllable devices 120 and the control-difficult devices 110 use. The upper limit amount of power is set in Dem. In a case of this example, $\lambda_i$ represents a power used by the controllable device i, $f_i$ represents the evaluation function set for the controllable device i, $\lambda_k$ represents a power used by a controllable adjacent device k, $f_k$ represents the evaluation function set for the controllable adjacent device k, and $K_1$ and $K_2$ represent gains for power change, respectively. Although the amount of the most recently measured power is preferably the amount of a current power, it may be the amount of power measured several minutes to several tens of minutes earlier dependent on the devices of the power consumption system.

Now, it will be considered how to set the evaluation function. Basically, the abscissa of the evaluation function sets a numerical value corresponding to power used in the device. In the device, such as the air conditioner 104, which is capable of comparatively and analogously setting power, the abscissa sets a continuous indicator having correlation to the power. For example, in a case of the air conditioner 104, the abscissa is a set temperature. This is because the air conditioner 104 normally carries out control by setting temperature without setting of power. The ordinate sets a value corresponding to priority because control of the priority.

However, it is necessary to examine how to make a shape of the evaluation function. Inasmuch as it is considered that an amount of the most operating status is comfort rate as principal concern, the present inventor considered that it is suitable a function having a peak value showing a correlation with the priority so as to take the peak at the maximum value of power used in the device in a case where there is no limitation of the upper limit power.

Figure 4:
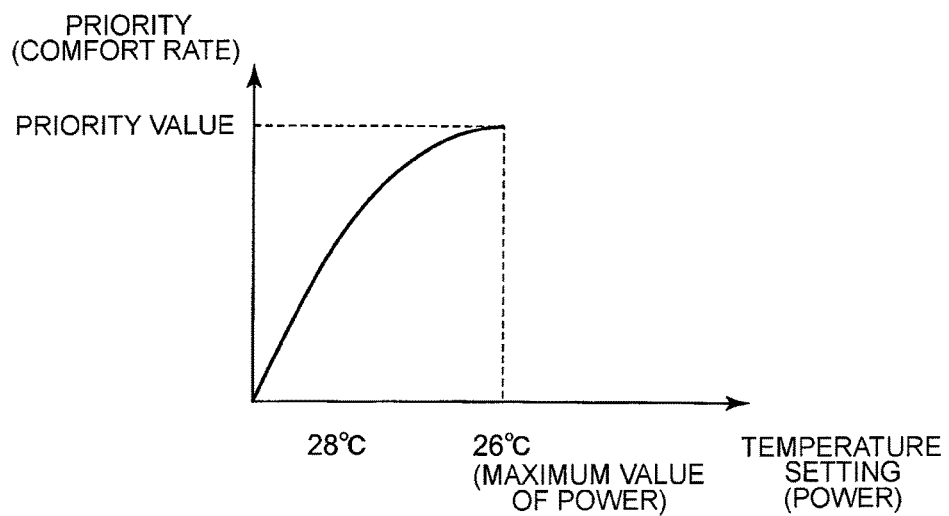
FIG. 4 is a view showing an example of the evaluation function of a device capable of analogically setting power used in the power control device according to the exemplary embodiment of this invention.

By the consideration described above, FIG. 4 is a view showing an example of an evaluation function set to the air conditioner 104. The example of FIG. 4 shows setting of the evaluation function for the air conditioner 104 in summer, temperature setting taking the maximum value of power is 26° C. It is noted that, in the case of temperature setting in summer, the value of the temperature setting decreases when it moves to the right along the abscissa because the amount of used power increases when the temperature setting decreases. Inasmuch as temperature setting of the air conditioner 104 in winder is the reverse of this, it may newly set the evaluation function in this circumstance. It is considered that temperature setting of 26° C. is the maximum of comfort rate, the ordinate takes the peak at this point. It is assumed that the value of peak is a value of priority set itself.

How to do the priorities depends on a design guideline of a system operator. The value of priorities may be any step, a natural number, a real number, or the same to other devices. It is no problem if it is a relative priority for the device in question.

In this day and age, a diffused LED (light emitting diode) electric light may adjust the intensity thereof continuously, in a case of such an electric light 102, it may set an evaluation function in a manner of the air conditioner 104. In other words, a set value of brightness is allocated to the abscissa, and it may take a peak at the maximum set value of brightness (the maximum value in the design guideline).

Now, how to do in a case of a device where ON/OFF is "0" or "1" such as a normal electric light 102 or an elevator 106. Although this is a hard nut to crack, the present invention resolved by controlling one integrating such several devices as a device. For example, in a case of electric lights 102, it regards integrating them each floor as a device while it regards integrating elevators 106 at a block of building as a device. Upon considering such a manner, the number of the devices is set to the abscissa of the evaluation function. It takes a peak at the maximum used number (the maximum value in the design guideline) and the peak value is the priority in which the devices are integrated.

Figure 5:
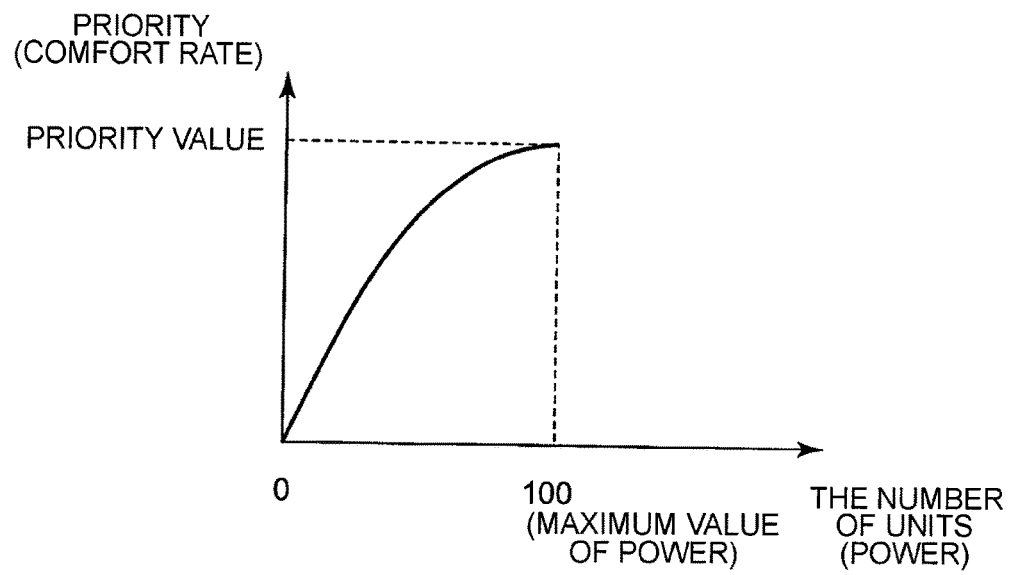
FIG. 5 is a view showing an example of the evaluation function of a device capable of digitally setting power used in the power control device according to the exemplary embodiment of this invention.

FIG. 5 shows such an invented evaluation function for a group of electric lights each of which can carry out on/off control alone. As a result of this, it is possible to favorably control the priorities for the devices each of which can carry out on/off control alone. By way of illustration, when control output for making the electric lights 102 in the entire floor 50% is issued, control for switching off the electric lights 102 every one unit is carried out. The other devices each of which can carry out on/off control alone may be controlled by setting the evaluation function shown in FIG. 5.

In this case, it may be a case where a control value is free from the set value of the device in a case where the abscissa is temperature setting or the number of units. In such a case, it may make approximations by setting the set value close thereto in the control value or the like. For example, when the control value of the number of units becomes 1.6, it may consider 2.

By setting the evaluation functions in the devices in the manner which is described above and by using the above-mentioned expression (4), it is possible to suitably carry out power control of the plurality of controllable devices 120 in real time. By this control, it is possible to make the total of the priorities of the respective devices the maximum value in a state where power used in the entire system or building including the controllable devices 120 and the control-difficult devices 110 matches the upper limit power. It is considered that the priority has correlation to the comfort rate, it is presumed that the comfort rate is maximum in this condition. By the exemplary embodiment of this invention, it is possible to perform a favorable demand response control without too patience.

There is other in setting of the evaluation function having the effect which is similar that of FIGS. 4 and 5.

Figure 6:
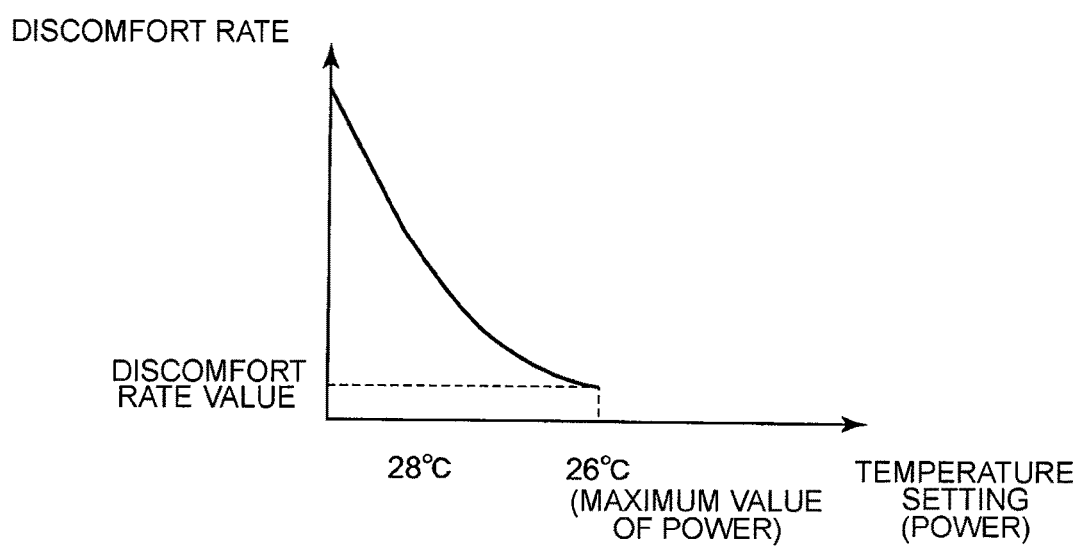
FIG. 6 is a view showing an example of the evaluation function of a device capable of analogically setting power used in the power control device according to the exemplary embodiment of this invention.
Figure 7:
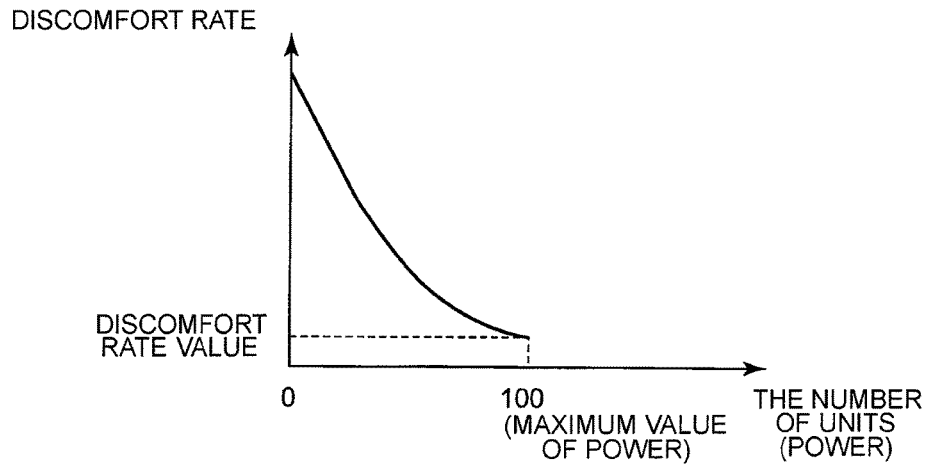
FIG. 7 is a view showing an example of the evaluation function of a device capable of digitally setting power used in the power control device according to the exemplary embodiment of this invention.

Those examples are shown in FIGS. 6 and 7. They are considered that the ordinate is the discomfort rate synonymous with the reciprocal of the priority or the comfort rate. Although it is necessary to control so as to become minimum without maximum because the discomfort rate, the above-mentioned expression (4) automatically makes a search for a minimum state of the entire system if this case creates as a convex function below as shown in FIGS. 6 and 7. This case also may correlate a value of the convex peak value below with the reciprocal (the discomfort rate) of the priority.

Inasmuch as the above-mentioned expression (4) uses the differential value of the evaluation function, a similar effect is obtained although any constant is added to the evaluation function as an offset. In addition, a similar effect is obtained although the evaluation function is from the begging expressed as one obtained by differentiating the convex function and the second right side term of the above-mentioned expression (4) is controlled as a difference of the evaluation function without a difference of the differential value of the evaluation function between the elements.

Example 1

Figure 8:
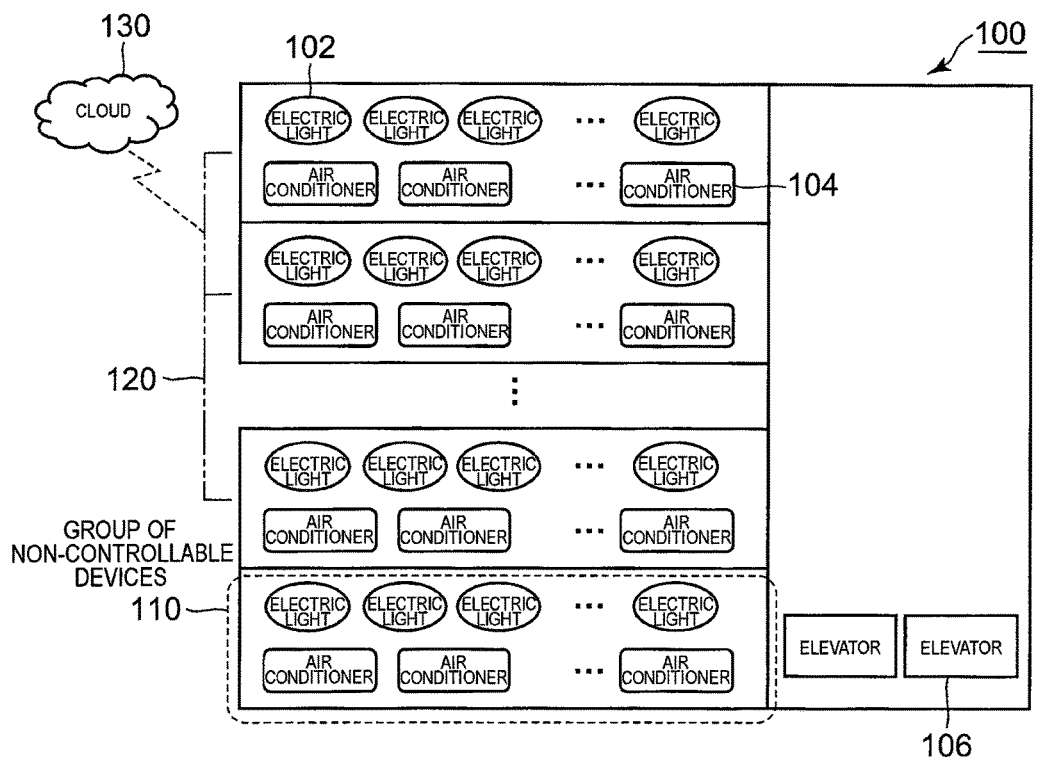
FIG. 8 is a schematic diagram of a power consumption system according to a first example of this invention.

In a first example, the description will proceed to an example in a case of carrying out a power control of devices in a building in a configuration illustrated in FIG. 8.

In the first example, information of the devices of the building is fed to a server on a cloud 130 and control is carried out by a control unit 10 (see, FIG. 9) constructed on the cloud 130. The evaluation function used one according to FIGS. 4 and 5. The control unit 10 serves as a power control device.

Figure 9:
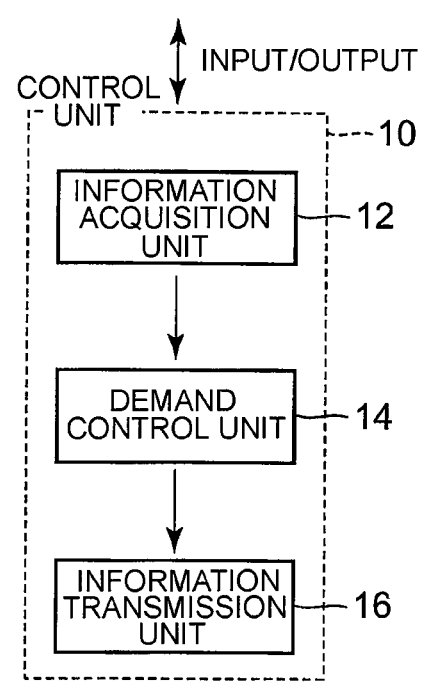
FIG. 9 is a block diagram of a controlling unit (a power control device) used in the power consumption system according to the first example of this invention.

FIG. 9 shows a flow of respective processing units of the control unit (the power control device) 10 on the cloud 130. The control unit (the power control device) 10 comprises an information acquisition unit 12, a demand control unit 14, and an information transmission unit 16.

The information acquisition unit 12 acquires amounts of power used by the controllable devices 120 of the building and an amount of the most recently measured power of the entire building to pass them to the demand control unit 14. The demand control unit 14 is configured to execute the above-mentioned expression (4) and calculates control values (temperature or the number of units) for the respective controllable devices 120 at a next time instant accordance with the expression (4). The demand control unit 14 approximates their values to actually controllable values to supply them to the information transmission unit 16. The information transmission unit 16 transmits the received control values for the respective controllable devices 120 at the next time instant to the respective controllable devices 120.

Thereafter, the above-mentioned processing is repeated. The demand control unit 14 hypothesizes that the respective devices are virtually connected on a network and determines adjacent devices according to the network.

Figure 10A:
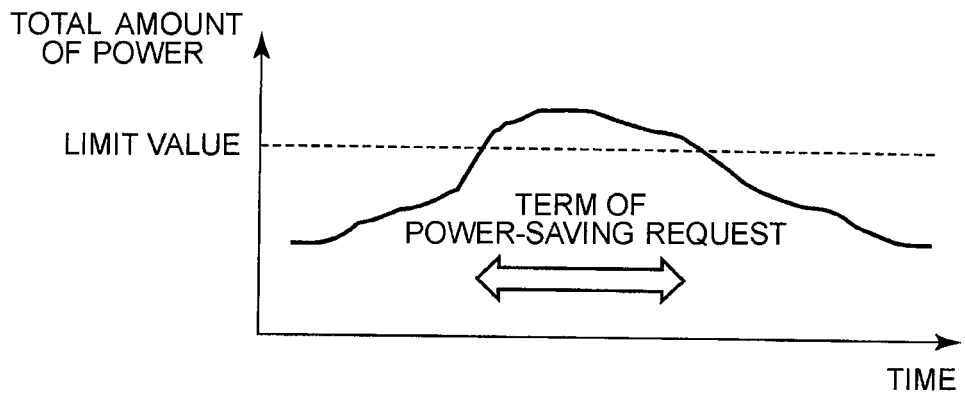
FIGS. 10A, 10B, and 10C are views showing experimental results in the power consumption system in a case of no control, in a related art, and in the first example of this invention, respectively.
Figure 10B:
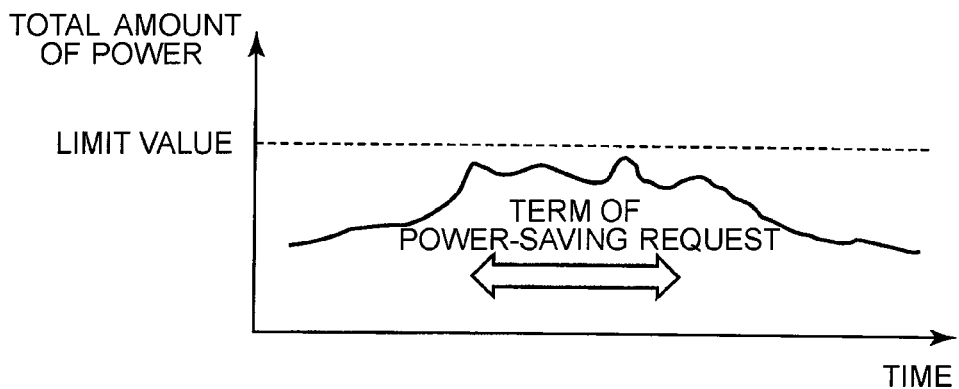
Figure 10C:
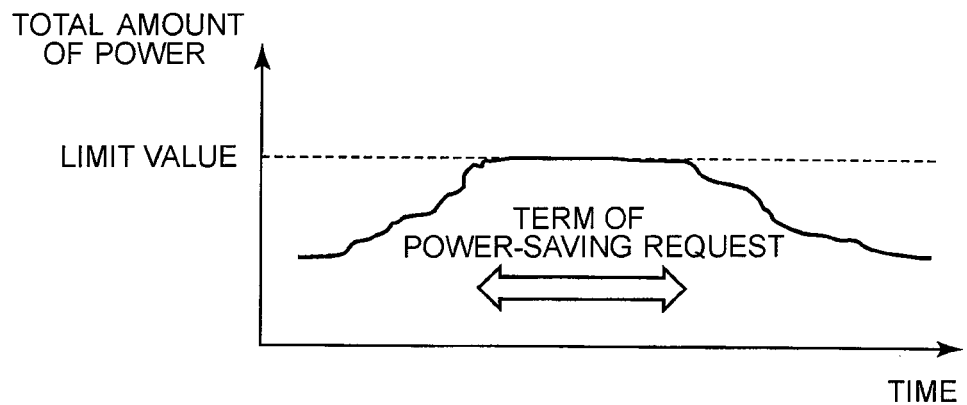

FIG. 10C shows a controlled result of the first example of the present invention and shows a time change of a total value of power used in the entire building. For comparison purposes, FIG. 10B shows a result obtained by controlling so as to stop predetermined devices in a related art while FIG. 10A shows a result in a case of control-free. The description will be made in conjunction with the results of the cases where the first example of the present invention is used. In each of FIGS. 10A, 10B, and 10C, a "limit value" represents an amount of power subject to a power-saving request.

As shown in FIG. 10A, in the case of the control-free, as a matter of course, it uses power beyond the power-saving request value.

On the other hand, as shown in FIG. 10C, in the case of the first example of the present invention, it is understood that the amount of power used in the entire building is properly controlled to the amount of power subject to the power-saving request because the devices are stopped in accordance with the priorities if it gets near the amount of power subject to the power-saving request.

In a related art control shown in FIG. 10B, it is understood that an unnecessary power-saving is made because the amount of power takes a value lower considerably than that of the power-saving request although the amount of power is limited to more than the power-saving request. In addition, it is understood that a total amount of power wanders also because power used by the non-controlled devices wonders during control. Inasmuch as it is necessary to take a wondered component into consideration, the related art control results in a little more power-saving.

Figure 11A:
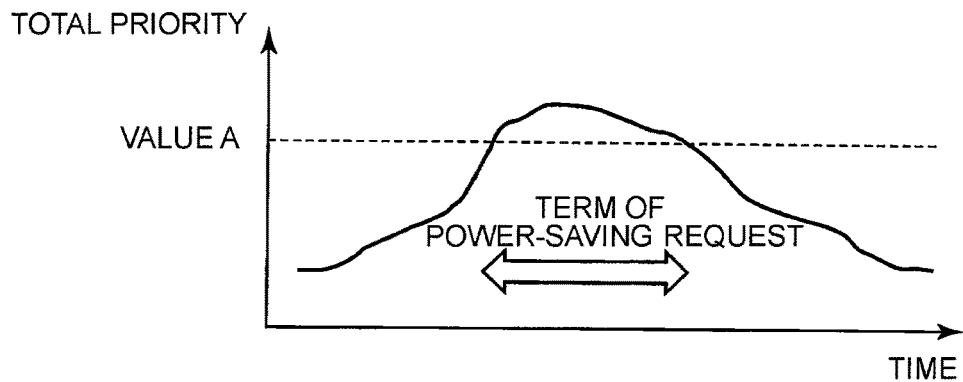
FIGS. 11A, 11B, and 11C are views showing experimental results in the power consumption system in a case of no control, in a related art, and in the first example of this invention, respectively.
Figure 11B:
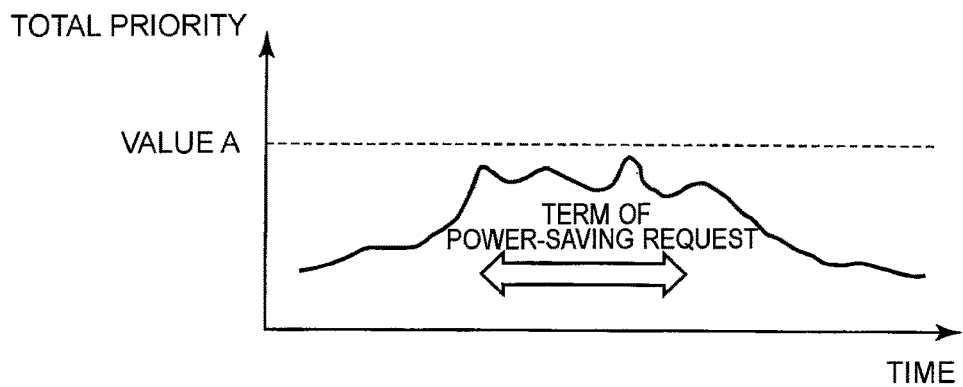
Figure 11C:
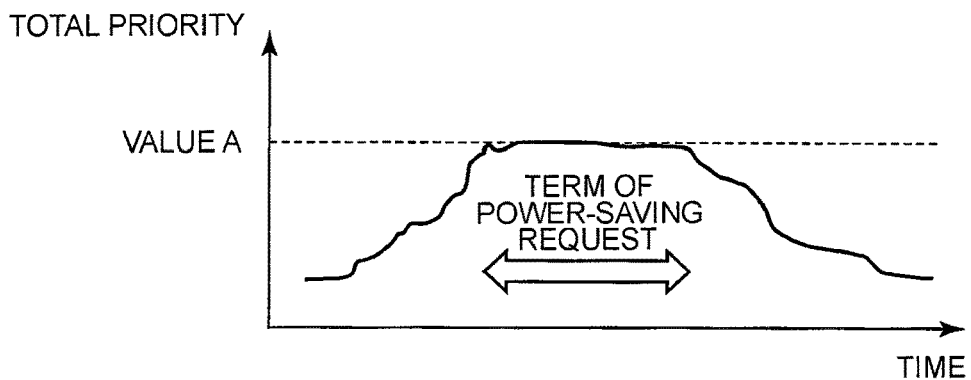

FIGS. 11A, 11B, and 11C show ones obtaining by calculating a total of priorities of all of the devices. FIGS. 11A, 11B, and 11C may be views showing the comfort rate of the entire building. FIGS. 11A, 11B, and 11C show results obtained by calculating in conjunction with cases of carrying out the control of FIGS. 10A, 10B, and 10C, respectively.

Those figures are figures having correlation to the total amount of power because, in this setting of the evaluation function, the upper the power becomes, the upper the priority becomes. In regard to the case of control-free (FIG. 11A) and the related art control (FIG. 11B), although it is intrinsically impossible to calculate a total sum of the priorities similar to that of the first example of the present invention, FIGS. 11A and 11B show values obtained by calculating in a case where it is assumed that the evaluation function similar to that of the first example of the present invention can be set in the respective devices.

As shown in FIG. 11A, the case of control-free has a high comfort rate because power is freely used. However, this case is out of the question because the power is freely used under the power-saving request.

As the first example of the present invention shown in FIG. 11C is compared with related art control shown in FIG. 11B, it is understood that the total sum of the priorities is higher in the first example of the present invention under the power-saving request. In other words, the first example of the present invention has succeeded in heightening the comport rate in the entire building under the power-saving request.

Hereinbefore, it is substantiated that it is possible to carry out power-saving with the most comfort under the power-saving request by the first example of the present invention and the validity of the present invention has been exhibited.

Example 2

Figure 12:
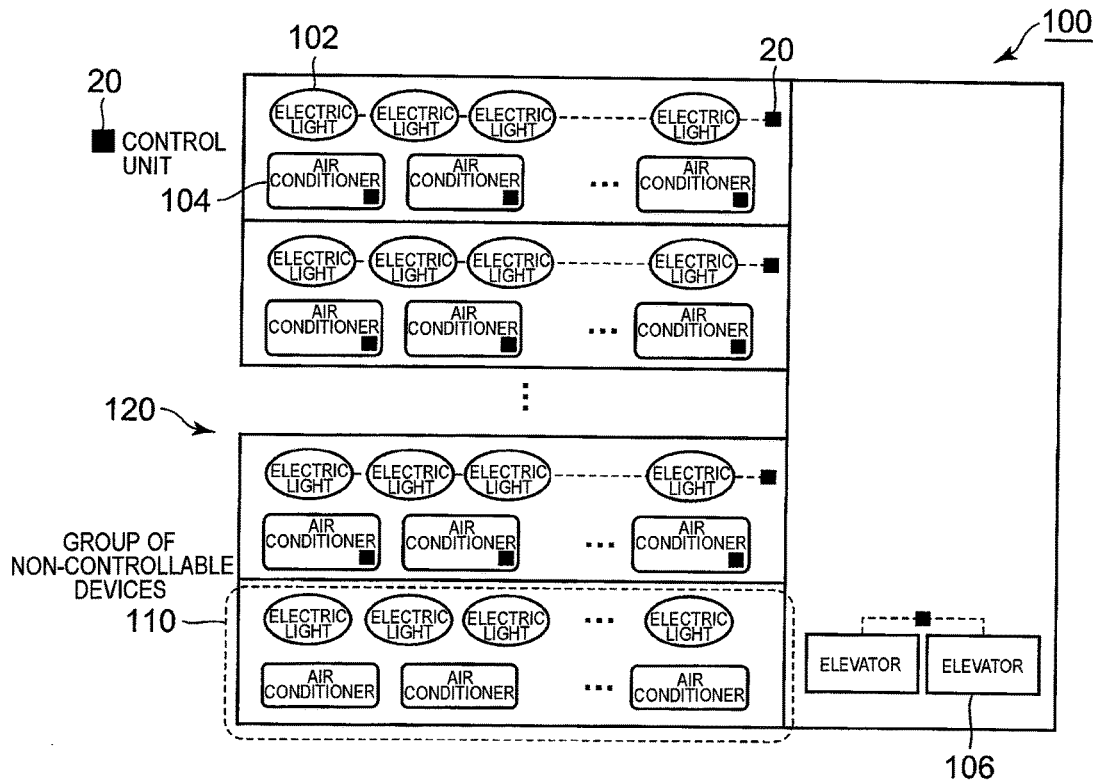
FIG. 12 is a schematic diagram of a power consumption system according to a second example of this invention.

In a second example, the description will proceed to an example in a case of carrying out a power control of devices in a building in a configuration illustrated in FIG. 12. Contracted with the above-mentioned first example, the second example is an example in which control units 20 are mounted in the respective devices in the building without carrying out control in the cloud and each device autonomously controls power. The plurality of control units 20 collectively serves as the power control device.

Although it is said the devices, respectively, it is considered that the devices in which turning on/off are digitally set only are one device by integrating them in the manner which is described above, one integrated control unit 20 is used. The integrated control unit 20 may be added to outside of the devices or may be used in any one of the integrated devices if respective devices have control functions. The respective devices are connected with a network structure. The network structure may be connected and topology thereof is not obtrusive.

Figure 13:
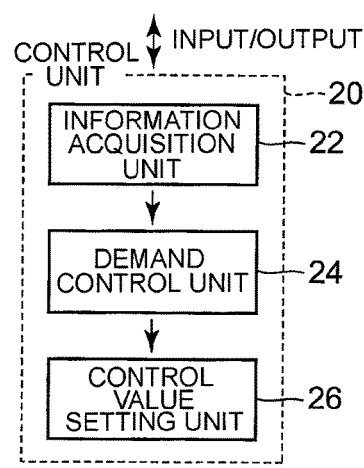
FIG. 13 is a block diagram of a controlling unit (a power control device) used in the power consumption system according to the second example of this invention.

FIG. 13 shows a schematic view of the control unit 20. Although it has an autonomous configuration, the control unit 20 makes an operation different from that of the control unit 10 of the abovementioned first example more or less.

The control unit 20 comprises an information acquisition unit 22, a demand control unit 24, and a control value setting unit 26.

The information acquisition unit 22 acquires not only the amount of power used by the controllable devices 120 in the building and the amount of the most recently measured power of the entire building but also information of other controllable devices 120 which are adjacent to them in a network fashion and passes them to the demand control unit 24. The demand control unit 24 is configured to execute the above-mentioned expression (4) and calculates control values (temperature or the number of units) for itself at a next time instant accordance with the expression (4). The demand control unit 24 approximates their values to actually controllable values to supply them to the control value setting unit 26. The control value setting unit 26 sets the received control values at the next time instant to itself. Thereafter, the above-mentioned processing is repeated.

When the control was really made, it obtained a result similar to that of the above-mentioned first example. In the second example also, the validity of the present invention has been substantiated.

In this connection, the method described above may be distributed, as a program executable by a computer, by storing a recording medium, such as a floppy (registered trademark) disk, a magnetic disk such as a hard disk, an optical disc such as a CD-ROM, a DVD and so on, a magneto-optical disk, a semiconductor memory, or the like.

Furthermore, the recording medium may have any form of a storage format if it is a recording medium which can store the program and which can be read by the computer.

In addition, an operating system operating on the computer or a middleware such as a database management software, a network software or the like may execute a part of the respective processing on the basis of instruction of the program installed from the recoding medium to the computer.

Moreover, the above-mentioned recording medium is not restricted to a medium independent from the computer and includes a recoding medium in which the program transmitted via an LAN, the Internet, or the like is downloaded and stored or temporarily stored.

In addition, the recording medium is not restricted to one and is included in a recording medium according to this invention in a case where processing according to the above-mentioned exemplary embodiment is carried out by a plurality of media, and configuration of the medium may be any configuration.

The computer executes respective processing based on the program stored in the recording medium and may be any configuration such as a device composed of a personal computer or the like, a system in which a plurality of devices are connected to a network, and so on.

In addition, the computer is not restricted to the personal computer and is equipment or a device which includes a processing unit included in an information processing unit and which is capable of realizing a function of this invention by using the program.

While the invention has been particularly shown and described with reference to exemplary embodiments thereof, the invention is not limited to these embodiments. It will be understood by those of ordinary skilled in the art that various changes in form and details may be made therein without departing from the sprit and scope of the present invention as defined by the claims.

For example, although the above-mentioned examples exemplify examples in which power is adjusted to no more than the power-saving request, the present invention may be used to a peak cut so as to limit a peak power. Inasmuch as a basic rate of a power rate is determined by the peak power, the peak power is not more than the upper limit power of the basic rate if the upper limit power of the basic rate is set in the control unit and this invention is carried out, and it is possible to limit the basic rate.

In addition, although the above-mentioned examples exemplify examples of the BEMS which is power control of the building, of course, it is possible to similarly carry out also in other energy managements such as the HEMS, the CEMS, or the like.

Although the above-mentioned first example carries out control by uploading the data in the server on the cloud, the present invention is not restricted to this, there's nothing wrong with placing the server in the building or a house to carry out similar control.

The whole or part of the exemplary embodiments disclosed above can be described as, but not limited to, the following supplementary notes.

Supplementary Note 1

A power control device for controlling a power used in a power consumption system comprising a plurality of devices, the plurality of devices being classified into controllable devices and control-difficult devices, wherein the power control device comprises:

an information acquisition unit configured to acquire amounts of power used by the controllable devices and an amount of the most recently measured power of the entire power consumption system; and a demand control unit configured to control the amounts of power used by the controllable devices based on evaluation functions set for the respective controllable devices and differential equations set for the respective controllable devices when an upper limit amount of power is set for the entire power consumption system.

Supplementary Note 2

The power control device according to Supplementary note 1, wherein the demand control unit controls so as to eliminate a difference between the upper limit amount of power and the amount of the most recently measured power of the entire power consumption system.

Supplementary Note 3

The power control device according to Supplementary note 2, wherein the demand control unit compares differential values derived from the evaluation functions among the controllable devices and controls so that the differential values derived from the evaluation functions are equal to each other among the controllable devices.

Supplementary Note 4

The power control device according to Supplementary note 3, wherein the differential equations are represented by the above-mentioned expression (4).

Supplementary Note 5

The power control device according to any one of Supplementary notes 1 to 4, wherein the evaluation functions comprise functions with respect to the amounts of power used by the controllable devices and have peak values which have correlation to priorities of the controllable devices.

Supplementary Note 6

The power control device according to any one of Supplementary notes 1 to 4, wherein the evaluation functions comprise functions with respect to the number of the controllable devices and have peak values which have correlation to priorities of the controllable devices.

Supplementary Note 7

A power control method of controlling a power used in a power consumption system comprising a plurality of devices, the plurality of devices being classified into controllable devices and control-difficult devices, wherein the power control method comprises:

an information acquisition step for acquiring amounts of power used by the controllable devices and an amount of the most recently measured power of the entire power consumption system;

a control step for controlling the amounts of power used by the controllable devices based on evaluation functions set for the respective controllable devices and differential equations set for the respective controllable devices when an upper limit amount of power is set for the entire power consumption system.

Supplementary Note 8

The power control method according to Supplementary note 7, wherein the control step controls so as to eliminate a difference between the upper limit amount of power and the amount of the most recently measured power of the entire power consumption system.

Supplementary Note 9

The power control method according to Supplementary note 8, wherein the control step compares differential values derived from the evaluation functions among the controllable devices and controls so that the differential values derived from the evaluation functions are equal among the controllable devices.

Supplementary Note 10

The power control method according to Supplementary note 9, wherein the differential equations are represented by the above-mentioned expression (4).

Supplementary Note 11

The power control method according to any one of Supplementary notes 7 to 10, wherein the evaluation functions comprise functions with respect to the amounts of power used by the controllable devices and have peak values which have correlation to priorities of the controllable devices.

Supplementary Note 12

The power control method according to any one of Supplementary notes 7 to 10, wherein the evaluation functions comprise functions with respect to the number of the controllable devices and have peak values which have correlation to priorities of the controllable devices.

Supplementary Note 13

A power control program causing a computer to control a power in a power consumption system comprising a plurality of devices, the plurality of devices being classified into controllable devices and control-difficult devices, wherein the power control program causes the computer to execute:

an information acquisition procedure for acquiring amounts of power used by the controllable devices and an amount of the most recently measure power of the entire power consumption system; and a control procedure for controlling the amounts of power used by the controllable devices based on evaluation functions set for the respective controllable devices and differential equations set for the respective controllable devices when an upper limit amount of power is set for the entire power consumption system.

Supplementary Note 14

The power control program according to Supplementary note 13, wherein the control procedure causes the computer to control so as to eliminate a difference between the upper limit amount of power and the amount of the most recently measured power of the entire power consumption system.

Supplementary Note 15

The power control program according to Supplementary note 14, wherein the control procedure causes the computer to compare differential values derived from the evaluation functions among the controllable devices and to control so that the differential values derived from the evaluation functions are equal among the controllable devices.

Supplementary Note 16

The power control program according to Supplementary note 15, wherein the differential equations are represented by the above-mentioned expression (4).

Supplementary Note 17

The power control program according to any one of Supplementary notes 13 to 16, wherein the evaluation functions comprise functions with respect to the amounts of power used by the controllable devices and have peak values which have correlation to priorities of the controllable devices.

Supplementary Note 18

The power control program according to any one of Supplementary notes 13 to 16, wherein the evaluation functions comprise functions with respect to the number of the controllable devices and have peak values which have correlation to priorities of the controllable devices.

This application is based upon and claims the benefit of priority from Japanese patent application No. 2013-131342, filed on Jun. 24, 2013, the disclosure of which is incorporated herein in its entirety by reference.

REFERENCE SIGNS LIST 10 control unit (power control device)
12 information acquisition unit
14 demand control unit
16 information transmission unit
20 control unit (power control device)
22 information acquisition unit
24 demand control unit
26 control value setting unit
100 power consumption system
102 electric light
104 air conditioner
106 elevator
110 group of non-controllable devices (control-difficulty devices)
120 controlled object (controllable devices)
130 cloud

What is claimed is:

1. A power control device for controlling a power used in a power consumption system comprising a plurality of devices, the plurality of devices being classified into controllable devices and uncontrollable devices,
wherein the power control device comprises:
an information acquisition unit configured to acquire amounts of power used by the controllable devices and an amount of the most recently measured power of the entire power consumption system; and
a demand control unit configured to control the amounts of power used by the controllable devices based on evaluation functions set for the respective controllable devices and differential equations set for the respective controllable devices when an upper limit amount of power is set for the entire power consumption system,
wherein the differential equations are represented by an expression (1) as follows:

$$\frac{d\lambda_i}{dt} = K_1 \frac{Dem - P_t}{Dem} + K_2 \left( \frac{df_i}{d\lambda_i} - \frac{df_k}{d\lambda_k} \right) \quad (1)$$

where $P_t$ represents the amount of the most recently measured power of the entire power consumption system, Dem represents the upper limit amount of power, $\lambda_i$ represents a power used in a controllable specific device i, $f_i$ represents the evaluation function set for the controllable specific device i, $\lambda_k$ represents a power for a controllable adjacent device k adjacent to the specific device i, $f_k$ represents the evaluation function set for the controllable adjacent device k, and $K_1$ and $K_2$ represent gains for power change, respectively.

2. The power control device as claimed in claim 1, wherein the demand control unit controls the amounts of power used by the controllable devices so as to eliminate a difference between the upper limit amount Dem of power and the amount $P_t$ of the most recently measured power of the entire power consumption system.

3. The power control device as claimed in claim 2, wherein the demand control unit compares differential values derived from the evaluation functions $f_i$ and $f_k$ among the controllable devices i and k and controls the amounts of power used by the controllable devices i and k so that the differential values derived from the evaluation functions $f_i$ and $f_k$ are equal to each other among the controllable devices i and k.

4. The power control device as claimed in claim 1, wherein the evaluation functions $f_i$ and $f_k$ comprise functions with respect to the amounts of power used by the controllable devices i and k and have peak values which have correlation to priorities of the controllable devices i and k.

5. The power control device as claimed in claim 1, wherein the evaluation functions $f_i$ and $f_k$ comprise functions with respect to the number of the controllable devices i and k and have peak values which have correlation to priorities of the controllable devices i and k.

6. A power control method of controlling a power used in a power consumption system comprising a plurality of devices, the plurality of devices being classified into controllable devices and uncontrollable devices, wherein the power control method comprises:

acquiring amounts of power used by the controllable devices and an amount of the most recently measured power of the entire power consumption system;

controlling the amounts of power used by the controllable devices based on evaluation functions set for the respective controllable devices and differential equations set for the respective controllable devices when an upper limit amount of power is set for the entire power consumption system, wherein the differential equations are represented by an expression (1) as follows:

$$\frac{d\lambda_i}{dt} = K_1 \frac{Dem - P_t}{Dem} + K_2 \left( \frac{df_i}{d\lambda_i} - \frac{df_k}{d\lambda_k} \right) \quad (1)$$

where $P_t$ represents the amount of the most recently measured power of the entire power consumption system, Dem represents the upper limit amount of power, $\lambda_i$ represents a power used in a controllable specific device i, $f_i$ represents the evaluation function set for the controllable specific device i, $\lambda_k$ represents a power for a controllable adjacent device k adjacent to the specific device i, $f_k$ represents the evaluation function set for the controllable adjacent device k, and $K_1$ and $K_2$ represent gains for power change, respectively.

7. The power control method as claimed in claim 6, wherein the controlling controls the amounts of power used by the controllable devices so as to eliminate a difference between the upper limit amount Dem of power and the amount $P_t$ of the most recently measured power of the entire power consumption system.

8. The power control method as claimed in claim 7, wherein the controlling compares differential values derived from the evaluation functions $f_i$ and $f_k$ among the controllable devices i and k and controls the amounts of power used by the controllable devices i and k so that the differential values derived from the evaluation functions $f_i$ and $f_k$ are equal among the controllable devices i and k.

9. A non-transitory computer readable recording medium for storing a power control program causing a computer to control a power in a power consumption system comprising a plurality of devices, the plurality of devices being classified into controllable devices and uncontrollable devices, wherein the power control program causes the computer to execute:

an information acquisition procedure for acquiring amounts of power used by the controllable devices and an amount of the most recently measure power of the entire power consumption system; and a control procedure for controlling the amounts of power used by the controllable devices based on evaluation functions set for the respective controllable devices and differential equations set for the respective controllable devices when an upper limit amount of power is set for the entire power consumption system, wherein the differential equations are represented by an expression (1) as follows:

$$\frac{d\lambda_i}{dt} = K_1 \frac{Dem - P_t}{Dem} + K_2 \left( \frac{df_i}{d\lambda_i} - \frac{df_k}{d\lambda_k} \right) \quad (1)$$

where $P_t$ represents the amount of the most recently measured power of the entire power consumption system, Dem represents the upper limit amount of power, $\lambda_i$ represents a power used in a controllable specific device i, $f_i$ represents the evaluation function set for the controllable specific device i, $\lambda_k$ represents a power for a controllable adjacent device k adjacent to the specific device i, $f_k$ represents the evaluation function set for the controllable adjacent device k, and $K_1$ and $K_2$ represent gains for power change, respectively.

* * * * *